United States Patent
Funcke et al.

(10) Patent No.: US 7,437,218 B2
(45) Date of Patent: Oct. 14, 2008

(54) METHOD AND DEVICE FOR CONTROLLING THE FUNCTIONAL UNIT OF A MOTOR VEHICLE

(75) Inventors: Guido Funcke, Besigheim-Ottmarsheim (DE); Stefan Keller, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/499,769

(22) PCT Filed: Dec. 20, 2002

(86) PCT No.: PCT/DE02/04695

§ 371 (c)(1),
(2), (4) Date: Jun. 21, 2005

(87) PCT Pub. No.: WO03/056427

PCT Pub. Date: Jul. 10, 2003

(65) Prior Publication Data

US 2005/0251308 A1      Nov. 10, 2005

(30) Foreign Application Priority Data

Dec. 21, 2001   (DE) .................................. 101 63 655

(51) Int. Cl.
B60R 21/01         (2006.01)

(52) U.S. Cl. .............................. 701/1; 701/45; 123/350; 706/908

(58) Field of Classification Search .................. 701/1, 701/45, 114; 123/350; 706/908, 916; 280/735
See application file for complete search history.

(56) References Cited

U.S. PATENT DOCUMENTS

| | | | | |
|---|---|---|---|---|
| 5,451,851 A | * | 9/1995 | Allen et al. | 318/602 |
| 5,772,238 A | * | 6/1998 | Breed et al. | 280/728.2 |
| 5,844,795 A | | 12/1998 | Johnston et al. | |
| 6,125,322 A | * | 9/2000 | Bischof et al. | 701/114 |
| 6,179,326 B1 | * | 1/2001 | Breed et al. | 280/735 |
| 6,533,316 B2 | * | 3/2003 | Breed et al. | 280/735 |
| 6,580,974 B2 | * | 6/2003 | Haag et al. | 701/1 |
| 6,691,064 B2 | * | 2/2004 | Vroman | 702/183 |
| 6,717,376 B2 | * | 4/2004 | Lys et al. | 315/292 |
| 6,728,616 B1 | * | 4/2004 | Tabe | 701/45 |
| 6,733,036 B2 | * | 5/2004 | Breed et al. | 280/735 |
| 6,959,235 B1 | * | 10/2005 | Abdel-Malek et al. | 701/33 |
| 7,040,435 B1 | * | 5/2006 | Lesesky et al. | 180/167 |
| 7,320,121 B2 | * | 1/2008 | Krueger | 717/106 |
| 2002/0016652 A1 | * | 2/2002 | Heckmann et al. | 701/1 |
| 2002/0082751 A1 | * | 6/2002 | Obradovich et al. | 701/1 |

FOREIGN PATENT DOCUMENTS

| | | |
|---|---|---|
| DE | 41 14 999 | 11/1992 |
| DE | 44 38 714 | 5/1996 |
| EP | 0 512 240 | 11/1992 |
| EP | 0 996 060 | 4/2000 |
| JP | 5-213061 | 8/1993 |
| WO | WO 97/33083 | 9/1997 |

* cited by examiner

Primary Examiner—Tuan C To
(74) Attorney, Agent, or Firm—Kenyon & Kenyon LLP

(57) ABSTRACT

A method and a device for controlling a functional unit of a motor vehicle are provided. In the method, a function sequence is implemented in a functional program. The functional program is verified here by a safety program, which is in turn monitored by a monitoring module. Like the safety program, the functional program has a modular structure. The monitoring of the safety program is accordingly implemented in multiple stages corresponding to the number of modules.

10 Claims, 3 Drawing Sheets

METHOD AND DEVICE FOR CONTROLLING THE FUNCTIONAL UNIT OF A MOTOR VEHICLE

FIELD OF THE INVENTION

The present invention relates to a method and a device for controlling a functional unit of a motor vehicle, in particular for controlling the drive unit. Furthermore, the present invention relates to a computer program for implementing the method.

BACKGROUND INFORMATION

To control the functional units of a motor vehicle, control units that execute functional programs for controlling the unit concerned are used. To ensure proper functioning, it is necessary to check for error-free sequence of the functional program. Safety programs that are executed in the control units serve this purpose. In order to offer additional safety, even these safety programs are normally monitored. Monitoring modules that monitor these safety programs typically serve this purpose.

In electronic control units, single-processor concepts are often used these days. Monitoring methods that facilitate safe operation even in the event of an error exist for these single-processor concepts. In this regard, the functional program is controlled with the help of the safety program. This basically takes place by comparing the input variable of the control unit representing the driver's request with the manipulated variables that determine performance. Like the functional program, the safety program runs in the function processor contained in the control unit. The correct program sequence of the safety program is ensured through special software structures and through a suitable communication sequence between the function processor and the monitoring module. Variations in time and value of the safety software are recognized by the monitoring module. In case of an error, the manipulated variables that determine performance are deactivated and/or a reset of the function processor is triggered.

A method and a device for controlling the drive unit of a vehicle is described in published German patent document DE 44 38 714. The method described serves to control a drive unit of a vehicle, in which the performance of the drive unit as a function of preset values is controlled at least in one operating state of the vehicle. Functions for performance control, as well as for monitoring the proper functioning of the power control, are also implemented. Only a single computing element, which implements the control as well as the monitoring, is provided for power control. At least two levels independent of one another, at least outside of the fault scenario, are provided in the computing element, the first level implementing the control and the second level implementing the monitoring. A third level may additionally be provided, which examines the computer's mode of operation by monitoring the level implementing the monitoring. The monitoring of the mode of operation of the first computing element is implemented by comparing the driver's request with the position of the element influencing the air beforehand.

Published German patent document DE 41 14 999 discloses a system for controlling a motor vehicle having a first device for determining the control data required for controlling the motor vehicle and a second device for monitoring the first device. Starting from a first data, the first device determines a second data in accordance with a test function, and starting from the first data, the second device determines a third data in accordance with the test function. The first and/or the second device, by way of comparing the second and third data, recognizes a safety-relevant fault status. The two devices consequently process signal values in a question-and-answer interaction, the second device inferring the correct or erroneous work of the microcomputer by comparing the results of this process.

The disadvantage of the above-described known methods is that the entire safety program has to be revised when the functional program is modified even slightly.

SUMMARY

The method according to the present invention for controlling a functional unit of a motor vehicle provides for a function sequence to be implemented in a functional program, which is verified by a safety program. The safety program is monitored by a monitoring module. The functional program has a modular structure, i.e., it is made up of multiple program modules. The safety program has a corresponding structure. The number of program modules of the functional program consequently corresponds to the number of safety program modules. The monitoring of the safety program is therefore implemented in multiple stages corresponding to the number of modules.

Each program module is consequently allocated a module of the safety program that exclusively checks the allocated functional program module.

Each module of the safety program delivers a partial contribution so that the monitoring module evaluates the totality of the partial contributions.

In an example embodiment of the present invention, the partial contributions are fed to the monitoring module via a decoder. The decoder combines the partial contributions and translates the result into a word of particular length. The type of combination of the partial contributions for communicating with the monitoring module in a decoder may be dispensed with if the partial contribution is utilized by one of the modules of the safety program in order to produce the partial contribution for another module, as a result of which the partial contributions are forwarded between the individual modules of the safety program. The partial contribution obtained last then contains partial contributions from all other modules.

The monitoring takes place by having test data sent from the monitoring module to the safety program, having output data determined by the safety program, and having the output data compared with the test data to monitor the safety program. In this way, through the monitoring module, it may be established whether correct output data has been determined while taking the test data into account. The safety program is deemed to run flawlessly only if this is the case.

In accordance with the present invention, the monitoring with the help of the safety program does not take place in one stage, as in the related art, but in multiple stages corresponding to the number of modules.

The device according to the present invention for controlling a functional unit of a motor vehicle includes a processor, e.g., a microcomputer. A functional program and a safety program that checks the functional program are executed on the microcomputer. In addition, a monitoring module is provided for monitoring the safety program. In the device according to the present invention, the functional program has a modular structure, i.e., it is made up of multiple program modules. The safety program has a corresponding structure. The monitoring of the safety program is therefore implemented in multiple stages, whose number corresponds to the number of modules of the safety program or the number of program modules. The stages may be implemented sequentially or parallel to one another.

The program modules and the modules of the safety program, the safety modules, may each be stored in separate memory units.

In an embodiment of the present invention, a decoder for forwarding partial contributions is provided, each safety module delivering a partial contribution.

A microcontroller or a gate logic, for example, may serve as a monitoring module.

The computer program according to the present invention has program codes for implementing all the steps of a method according to the present invention when the computer program is executed on a corresponding processor. The processor may be provided in a control unit according to the present invention.

The computer program product according to the present invention has program codes which are stored on a computer-readable storage medium. The program codes serve to implement the method according to the present invention.

DETAILED DESCRIPTION

Figure 1:
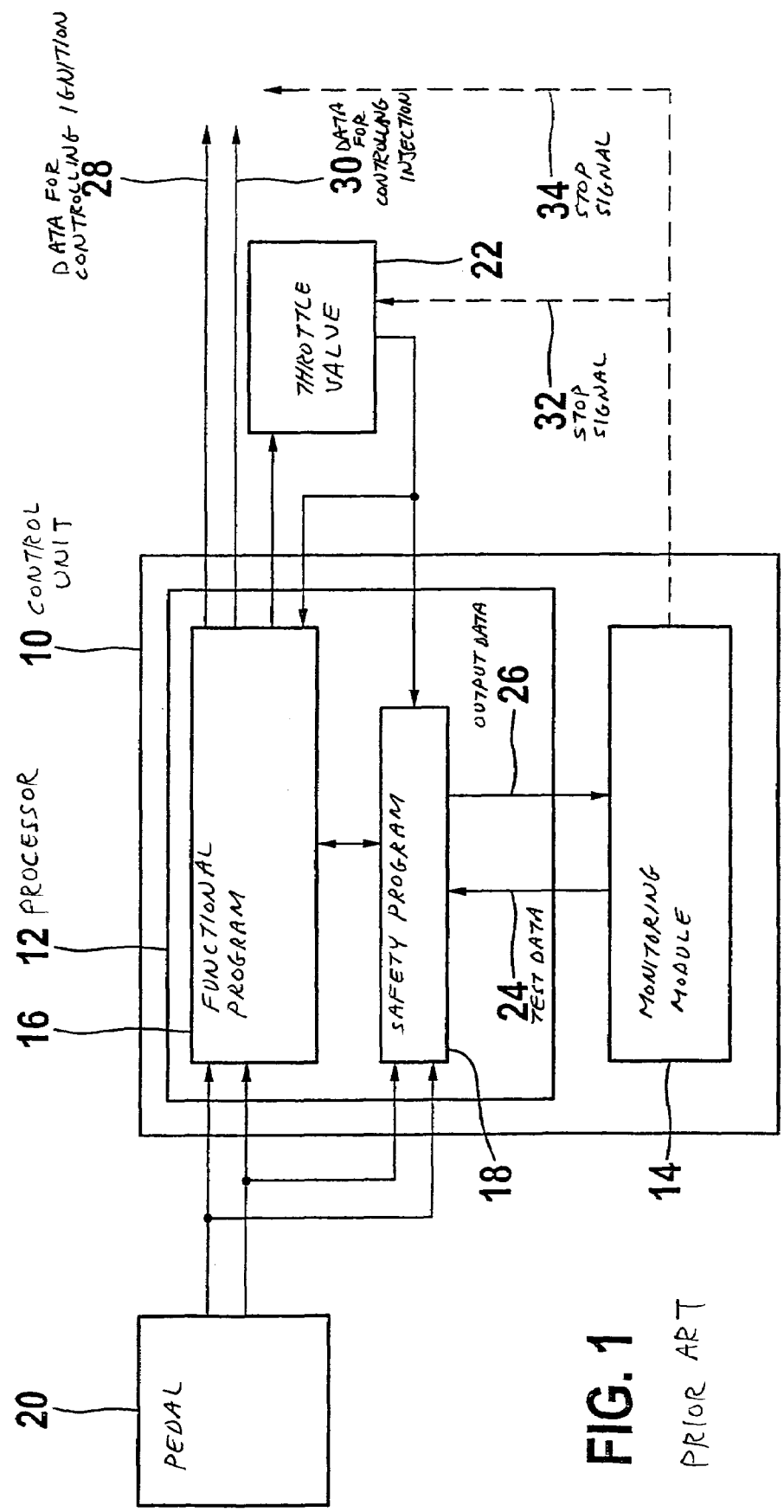
FIG. 1 shows a block diagram of a control unit according to the related art.

A control unit 10 according to the related art is illustrated in FIG. 1. Control unit 10 serves to control a system for an electronic gas pedal (EGAS).

A processor (function processor) 12 and a monitoring module 14 can be seen. A functional program 16 and a safety program 18 are shown in processor 12.

Through a pedal 20, a driver of the motor vehicle transmits the driver's request to control unit 10. The driver's request, as an input variable, is processed by functional program 16, which outputs an output variable for an electric-driven throttle valve 22.

The driver's request as an input variable is also sent to safety program 18, which checks functional program 16; this is done by validating the driver's request using the manipulated variables that determine the performance and are obtained from throttle valve 22.

A monitoring concept that facilitates safe operation even in the event of an error exists for the illustrated single-processor concept. For that, as previously described, functional program 16 is checked with the help of safety program 18. The basic idea here is the validation of the driver's request (e.g., pedal action) using the manipulated variables that determine performance (e.g., position of the throttle valve). Like functional program 16, safety program 18 is executed in processor 12. The correct program sequence of safety program 18 is ensured through special software structures and through a suitable sequence of communication between processor 12 and monitoring module 14. Variations in time and value of safety software 18 are recognized by monitoring module 14. In the event of an error, the manipulated variables that determine performance are deactivated and/or a reset of function processor 12 is triggered. For this purpose, as indicated by an arrow 24, test data is sent by monitoring module 14 to safety program 18, which in turn processes this test data and, on the basis thereof, determines output data and, as indicated by an arrow 26, sends this to monitoring module 14. With this output data, monitoring module 14 may monitor whether the execution of safety program 18 is flawless.

Functional program 16 outputs data for controlling the ignition, as shown by an arrow 28, and data for controlling the injection, as indicated by an arrow 30. If monitoring module 14 determines an error, it may cause the operation of throttle valve 22 to stop, as shown by an arrow 32 with broken lines, and the operation of the ignition and the injection not to be implemented, as indicated by an arrow 34.

Using the input data of control unit 10, safety program 18 consequently examines whether this data is plausible, while monitoring module 14 monitors the proper mode of operation of safety program 18.

Figure 2:
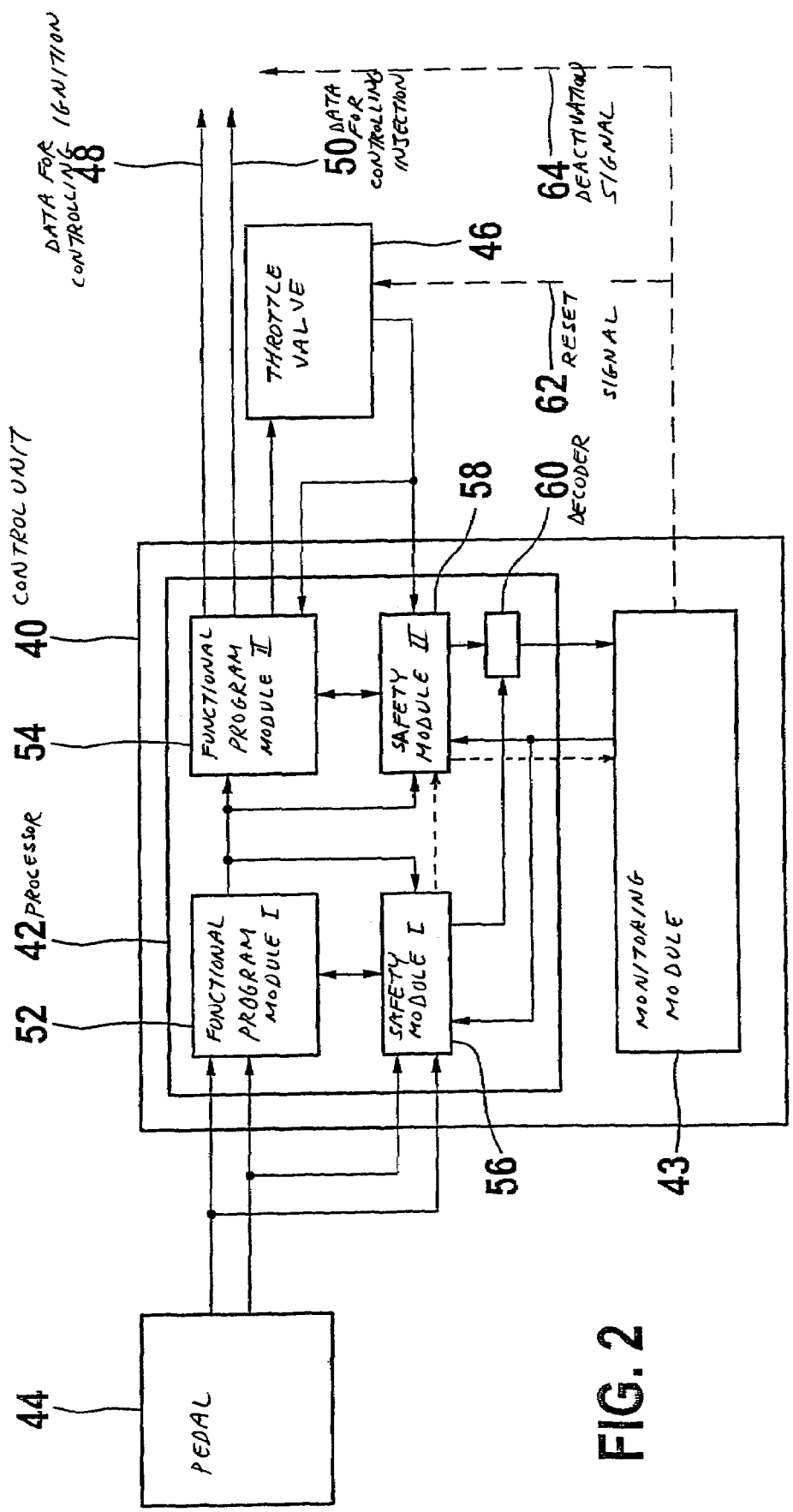
FIG. 2 shows a block diagram of an example embodiment of the device according to the present invention.

Shown in FIG. 2 is an example embodiment of the device according to the present invention, i.e., a control unit 40 according to the present invention. Control unit 40 includes a processor 42 and a monitoring module 43. Control unit 40 serves to process data output by an EGAS 44 and to actuate a throttle valve 46, the ignition, as indicated by an arrow 48, and the injection, as shown by an arrow 50.

The functional program is made up of a program module I 52 and a program module II 54. The safety program correspondingly exhibits a safety module I 56 and a safety module II 58. Furthermore, a decoder 60 is maintained in processor (or function processor) 42. Through suitable setting of the interface, the functional range of the functional program is consequently divided into two program modules 52, 54. Two appropriate safety modules 56, 58 are implemented in function processor 42, suitable for these two program modules 52, 54. The interface between the program parts, i.e., program module I 52 and program module II 54, is specified here such that program module I 52 is monitored with the help of safety module I 56. Program module II 54 is correspondingly monitored through safety module II 58.

Thus, the monitoring does not take place in one stage (validation of the driver's request using the manipulated variables that determine performance), but in two stages. The first stage contains the validation of the driver's request with the defined interface variables. The second stage contains the validation of the defined interface variables using the manipulated variables that determine performance.

The correct program sequence of the two safety modules 56, 58 is ensured through special software structures and through a suitable sequence of communication between function processor 42 and monitoring module 43. For this purpose, safety module I 56 as well as safety module II 58, with the help of suitable algorithms, each provide a partial contribution for communication with the monitoring module. Decoder 60 combines the partial contributions and transmits to monitoring module 43 the overall result as a word of a particular bit length readable by monitoring module 43. Variations in time and value of both safety modules 56, 58 are thus recognized by monitoring module 43. In the event of an error, the manipulated variables that determine performance are deactivated and/or a reset of function processor 42 is triggered. This is illustrated by an arrow 62 and an arrow 64.

The device according to the present invention facilitates independent development for the individual program modules as well as for the individual safety modules. This facilitates a simplification of a distributed development with the possibility of developing and using independent software modules. Parts of the functional program may be structured such that they are modularly interchangeable. In connection with the functional program, only the corresponding part of the safety program needs to be exchanged, without having to revise the complete safety program.

Figure 3:
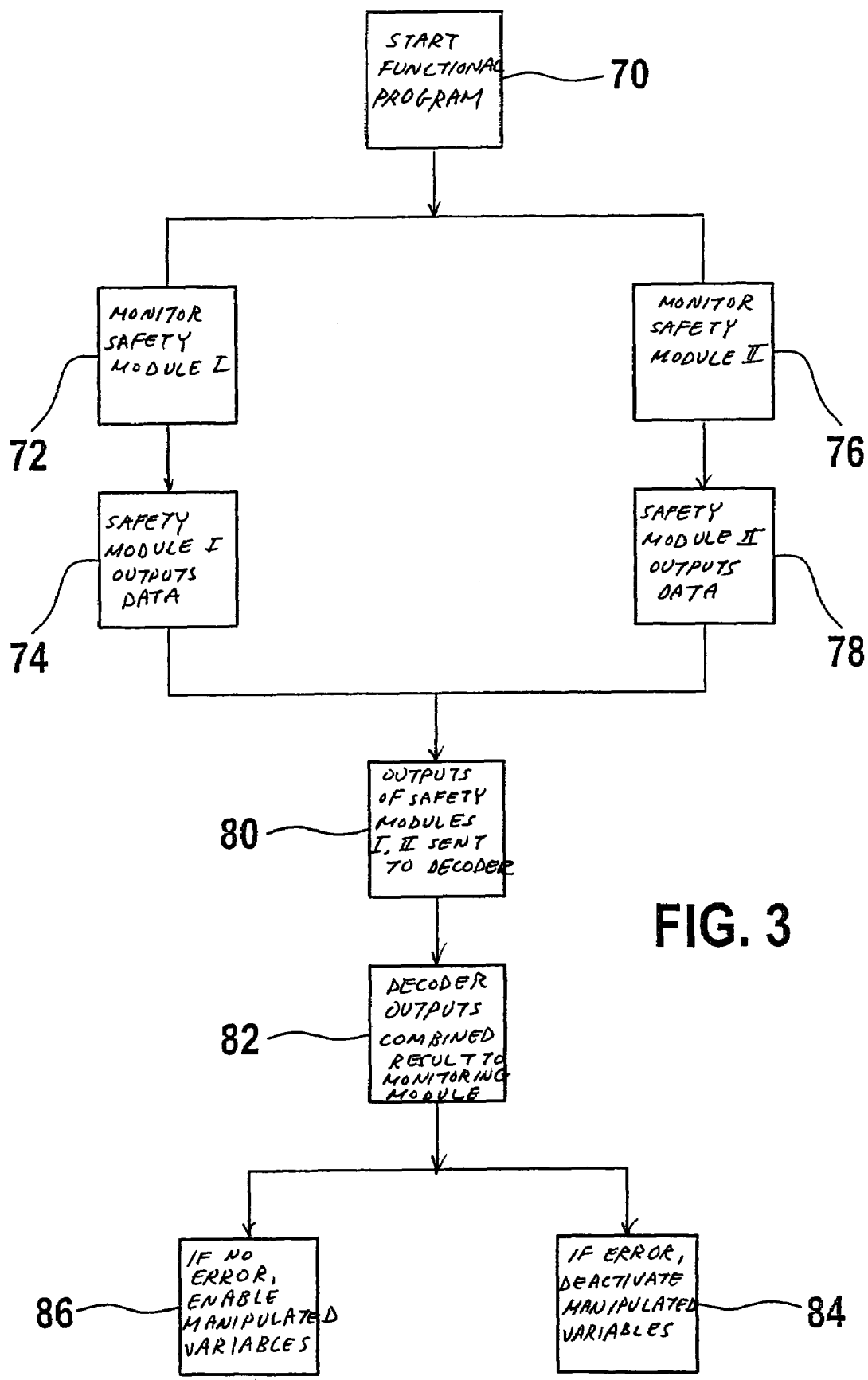
FIG. 3 shows a flowchart of an example embodiment of the method according to the present invention.

An example embodiment of the method according to the present invention is shown in FIG. 3 as a flowchart.

The functional program is started in a step 70. During the program processing and verification of the input data through the safety program, safety module I 56 is monitored in a first stage 72, in which this receives test data initially from monitoring module 43. In a step 74, safety module I 56 determines output data, or the so-called partial contribution. Safety module II 58 is correspondingly monitored in a step 76 and likewise delivers a partial contribution in a step 78.

In the embodiment shown, the verification of safety modules 56, 58 takes place simultaneously. It is also feasible for the monitoring to run sequentially, i.e., safety module I 56 is initially monitored and then safety module II 58 is monitored.

The partial contributions of safety modules 56, 58 are sent to decoder 60 in a step 80. This combines the partial contributions together in a step 82 and transmits the result to monitoring module 43.

Monitoring module 43 examines the obtained result, using the data output, and decides whether there is an error. If this is case, the manipulated variables that determine performance are deactivated in a step 84. When safety modules 56, 58 are functioning properly, the manipulated variables are enabled in a step 86.

The method of combining partial contributions for communication with monitoring module 43 in a decoder 60 may be omitted if the partial contribution from safety module I 56 is utilized in order to generate the partial contribution for safety module II 58. In this case, the partial contribution of safety module II 58 automatically includes a partial contribution from safety module I 56. This scenario is shown in FIG. 2 by the dotted lines among modules 56, 58 and 43.

What is claimed is:

1. A method for controlling a functional unit of a motor vehicle, comprising:

implementing a function sequence for the functional unit by a functional program, wherein the functional program has a modular organizational structure including at least two functional modules;

verifying the functional program by a safety program, wherein the safety program has a modular organizational structure including at least two safety modules corresponding to the at least two functional modules; and monitoring the safety program by a monitoring module, wherein the monitoring of the safety program is implemented in multiple parts corresponding to the number of safety modules;

wherein the at least two safety modules of the safety program each generate a partial contribution as output, and wherein the partial contributions are fed to the monitoring module for evaluation; and wherein the partial contributions are initially provided from the at least two safety modules to a decoder, and wherein the partial contributions are fed to the monitoring module from the decoder.

2. A method for controlling a functional unit of a motor vehicle, comprising:

implementing a function sequence for the functional unit by a functional program, wherein the functional program has a modular organizational structure including at least two functional modules;

verifying the functional program by a safety program, wherein the safety program has a modular organizational structure including at least two safety modules corresponding to the at least two functional modules; and monitoring the safety program by a monitoring module, wherein the monitoring of the safety program is implemented in multiple parts corresponding to the number of safety modules;

wherein the at least two safety modules of the safety program each generate a partial contribution as output, and wherein the partial contributions are fed to the monitoring module for evaluation; and wherein the partial contribution of a first one of the two safety modules is initially forwarded to a second one of the two safety modules, and wherein the partial contributions of the two safety modules are fed to the monitoring module from the second one of the two safety modules.

3. A method for controlling a functional unit of a motor vehicle, comprising:

implementing a function sequence for the functional unit by a functional program, wherein the functional program has a modular organizational structure including at least two functional modules;

verifying the functional program by a safety program, wherein the safety program has a modular organizational structure including at least two safety modules corresponding to the at least two functional modules; and monitoring the safety program by a monitoring module, wherein the monitoring of the safety program is implemented in multiple parts corresponding to the number of safety modules;

wherein the monitoring includes:

sending test data from the monitoring module to the two safety modules;

generating, from the two safety modules, output data; and comparing, in the monitoring module, the output data with the test data.

4. A method for controlling a functional unit of a motor vehicle, comprising:

implementing a function sequence for the functional unit by a functional program, wherein the functional program has a modular organizational structure including at least two functional modules;

verifying the functional program by a safety program, wherein the safety program has a modular organizational structure including at least two safety modules corresponding to the at least two functional modules; and monitoring the safety program by a monitoring module, wherein the monitoring of the safety program is implemented in multiple parts corresponding to the number of safety modules;

wherein the at least two safety modules of the safety program each generate a partial contribution as output, and wherein the partial contributions are fed to the monitoring module for evaluation; and wherein the monitoring includes:

sending test data from the monitoring module to the two safety modules;

generating, from the two safety modules, the partial contributions as output data; and comparing, in the monitoring module, the output data with the test data.

5. A method for controlling a functional unit of a motor vehicle, comprising:

implementing a function sequence for the functional unit by a functional program, wherein the functional program has a modular organizational structure including at least two functional modules;

verifying the functional program by a safety program, wherein the safety program has a modular organizational structure including at least two safety modules corresponding to the at least two functional modules; and monitoring the safety program by a monitoring module, wherein the monitoring of the safety program is implemented in multiple parts corresponding to the number of safety modules;

wherein the at least two safety modules of the safety program each generate a partial contribution as output, and wherein the partial contributions are fed to the monitoring module for evaluation;

wherein the partial contributions are initially provided from the at least two safety modules to a decoder, and wherein the partial contributions are fed to the monitoring module from the decoder; and wherein the monitoring includes:
  sending test data from the monitoring module to the two safety modules;
  generating, from the two safety modules, the partial contributions as output data; and
  comparing, in the monitoring module, the output data with the test data.

6. A hardware-implemented computer-readable storage medium having stored thereon a computer program including a plurality of program codes executable by a computer, the program codes, when executed, causing the computer to perform a method for controlling a functional unit of a motor vehicle, the method comprising:

implementing a function sequence for the functional unit by a functional program, wherein the functional program has a modular organizational structure including at least two functional modules;

verifying the functional program by a safety program, wherein the safety program has a modular organizational structure including at least two safety modules corresponding to the at least two functional modules; and monitoring the safety program by a monitoring module, wherein the monitoring of the safety program is implemented in multiple parts corresponding to the number of safety modules;

wherein the at least two safety modules of the safety program each generate a partial contribution as output, and wherein the partial contributions are fed to the monitoring module for evaluation; and wherein the partial contributions are initially provided from the at least two safety modules to a decoder, and wherein the partial contributions are fed to the monitoring module from the decoder.

7. A device for controlling a functional unit of a motor vehicle, comprising:
  a processor configured to:
    execute a functional program that implements a function sequence for the functional unit, wherein the functional program has a modular organizational structure including at least two functional modules;
    execute a safety program that verifies the functional program, wherein the safety program has a modular organizational structure including at least two safety modules corresponding to the at least two functional modules;
  a hardware-implemented monitoring module configured to monitor the safety program, wherein the monitoring of the safety program is implemented in multiple parts corresponding to the number of safety modules; and
  wherein the execution of the at least two safety modules of the safety program each generates a partial contribution as output, and wherein the device is configured for the partial contributions to be fed to the monitoring module for evaluation; and
  wherein the device is configured for the partial contributions to be initially provided from the at least two safety modules to a decoder, and for the partial contributions to be fed to the monitoring module from the decoder.

8. The device as recited in claim 7, wherein each of the functional modules and the safety modules are stored in separate memory units.

9. The device as recited in claim 7, wherein the monitoring module is a microcontroller.

10. A device for controlling a functional unit of a motor vehicle, comprising:
  a processor configured to:
    execute a functional program that implements a function sequence for the functional unit, wherein the functional program has a modular organizational structure including at least two functional modules;
    execute a safety program that verifies the functional program, wherein the safety program has a modular organizational structure including at least two safety modules corresponding to the at least two functional modules;
  a hardware-implemented monitoring module configured to monitor the safety program, wherein the monitoring of the safety program is implemented in multiple parts corresponding to the number of safety modules; and
  wherein the monitoring includes:
    sending test data from the monitoring module to the processor for the two safety modules;
    generating, via the execution of the two safety modules, output data; and
    comparing, in the monitoring module, the output data with the test data.

* * * * *